United States Patent

Fujimoto

[15] 3,646,369

[45] Feb. 29, 1972

[54] MULTIPHASE FIELD EFFECT TRANSISTOR DC DRIVER

[72] Inventor: Ted Y. Fujimoto, Santa Ana, Calif.

[73] Assignee: North American Rockwell Corporation

[22] Filed: Aug. 28, 1970

[21] Appl. No.: 76,340

[52] U.S. Cl. ..............................307/270, 307/279, 307/205, 307/208

[51] Int. Cl. ..........................................................H03k 3/26

[58] Field of Search ..............307/221 C, 251, 279, 270, 205, 307/208

[56] References Cited

UNITED STATES PATENTS 3,440,444 4/1969 Rapp..................................307/205 X
3,524,077 8/1970 Kaufman............................307/205 X
3,551,693 12/1970 Burns.................................307/279 X
3,573,498 4/1971 Ahrons.................................307/279

*Primary Examiner*—John S. Heyman
*Attorney*—L. Lee Humphries, H. Frederick Hamann and Robert G. Rogers

[57] ABSTRACT

A voltage boosting circuit provides a boosted voltage level on the gate electrode of a field effect transistor driver in response to a logic input signal during a second phase of a four phase clock cycle. A field effect transistor connected as a rectifying device prevents the gate voltage from changing during at least the third and fourth phases of the clock cycle. As a result, the field effect transistor driver provides a DC output voltage level. During the second phase of the subsequent cycle, if the input has not changed, the gate voltage is reset to the boosted voltage level. If the input has changed, during the first phase of the clock cycle the gate voltage is reset to a different voltage level and maintained until the input again changes.

6 Claims, 3 Drawing Figures

INVENTOR.
TED Y. FUJIMOTO
BY Robert G. Rogers
ATTORNEY

INVENTOR.
TED Y. FUJIMOTO

BY Robert G. Rogers

ATTORNEY

INVENTOR.
TED Y. FUJIMOTO
BY Robert G. Rogers
ATTORNEY

MULTIPHASE FIELD EFFECT TRANSISTOR DC DRIVER

BACKGROUND OF THE INVENTION

1. Field of the Invention

The invention relates to a multiphase field effect transistor DC driver and more particularly to such a driver in which the gate voltage of a field effect transistor is boosted during one phase of a multiphase clock cycle and isolated during the remaining phases of the clock cycle until changed as a function of an input to the driver.

2. Description of Prior Art

Circuit designers have had difficulty in producing a relatively simple field effect transistor DC driver having a relatively small size and low-power dissipation. As a result, circuits have been developed for providing output voltage levels during clocked intervals of time. In other words, the output voltage level is continuously being restored during each clock cycle and the output is generally guaranteed good only during the clock cycle. It should be obvious that certain circuit applications require a constant output voltage level (DC) without the necessity for changing the voltage level as a function of a clocking signal.

A field effect transistor circuit is preferred therefore that can produce a DC voltage level representing a logic "1" for relatively long periods of time. Usually the DC voltage level is approximately equal to the supply voltage level for the circuit. The DC voltage levels should be capable of providing a relatively high current to a DC load. The present field effect transistor driver provides a circuit for driving a DC load with voltage levels representing either a logic "1" (true) or logic "0" (false) as a function of an input signal.

SUMMARY OF THE INVENTION

Briefly, the invention comprises a multiphase field effect transistor DC driver for providing DC voltage levels representing either a logic "1" (true) or logic "0" (false) as a function of an input signal. The DC output voltage levels satisfy the voltage and current requirements for a DC load.

In the preferred embodiment of the driver circuit, a voltage level is provided at the gate electrode of a field effect transistor DC driver during a first phase recurring clock signal of a four phase clock cycle. The field effect transistor driver is connected between a DC load and a supply voltage. During a second phase recurring clock signal, the voltage level is boosted by a voltage boost circuit for substantially enhancing the conduction of the field effect transistor DC driver. As a result of the boost in the gate electrode voltage of the field effect transistor, the threshold loss through the transistor is reduced and substantially all of the supply voltage is provided across the DC load.

A field effect transistor operated as a diode rectifier is connected between the voltage boost circuit and the gate electrode for preventing a change in the gate electrode voltage until the next boosting phase of the clock cycle. As a result, the DC output voltage provided by the field effect transistor driver remains constant for at least the third and fourth phase recurring clock signals of the four phase clock cycle.

During the next clock cycle, if the input signal does not change, the gate voltage is reset to the boosted voltage level, and is again isolated for the remainder of the clock cycle. Sometimes, it is necessary to reset the gate voltage to restore charge which has leaked off since the last clock cycle. Charge providing the gate voltage is stored by the inherent capacitance of the gate electrode node. If necessary a discrete capacitance can be added.

Since the conduction of the field effect transistor driver is substantially enhanced, a smaller device can be used. Without the boosting effect, a relatively larger device would be required since the larger device would have a lower impedance drop during conduction.

In addition, by reducing the voltage drop across the field effect transistor driver, less power is dissipated so that the device can be held on for longer periods of time. It would be possible to provide an output voltage substantially equal to the supply voltage by boosting the voltage on the gate electrode except that a DC load is being driven. Since a DC load is being driven, the supply voltage is necessarily divided between the field effect transistor driver and the DC load. Therefore it is important that very little supply voltage be dropped across the field effect transistor driver. The minimum drop permitted depends on the requirements of the DC load. The DC output voltage divided by the impedance of the DC load determines the maximum current through the load.

In a second embodiment, a second field effect transistor driver is connected between the output and a reference voltage level such as electrical ground representing a logic 0 state. A DC load such as a resistor is connected between the output and a voltage level for supplying current to the transistor when it is on. As a result, when a logic "1" DC voltage is not being provided at the output by the first driver, a logic "0" DC voltage is provided at the output by the second driver. For the latter embodiment, when the input changes, the first field effect transistor driver is turned on. The drivers are operated in a push-pull arrangement.

For the preferred embodiments described and shown herein, P-type metal oxide semiconductor (MOS) field effect transistors are described and shown. P-type MOS devices can be turned on by clock signals having a negative level. Such devices usually have their drain electrodes connected to a negative supply voltage or in the alternative have the gate and/or drain electrodes connected to a clock signal which alternates between electrical ground and a voltage approximately equal to a supply voltage. It should be understood, however, that both N- and P-type devices can be used within the scope of the invention and in certain embodiments both types of devices can be used together in implementing a multiphase field effect transistor DC driver. In addition, the invention is not limited to MOS devices. In MOS, silicon gate and the types of devices known to persons skilled in the art can be used.

Therefore, it is an object of this invention to provide an improved multiphase field effect transistor DC driver.

Another object of this invention is to provide a multiphase field effect transistor DC driver for providing a DC voltage representing one logic state across a DC load for an indefinite period of time.

A still further object of this invention is to provide a four phase field effect transistor DC driver for providing a constant DC level at a DC load using a relatively small field effect transistor driver which dissipates relatively reduced amounts of power.

A further object of this invention is to provide a four phase field effect transistor DC driver for providing a constant DC output voltage for a DC load over an extended period of time by boosting the voltage on the gate electrode of the field effect transistor driver during one phase time of a four phase gating cycle and isolating the boosted voltage from the remainder of the circuit until changed as a function of the input signal.

A still further object of this invention is to provide a four phase MOS DC driver in which the gate voltage of the MOS driver is boosted during one phase time for providing a DC output voltage, and is isolated for at least two adjacent phase times of the multiple phase cycle whereupon it is either reset to the boosted voltage value or changed as a function of a logic input signal.

Still a further object of this invention is to provide a four phase field effect transistor DC driver using a push-pull output for providing DC voltage levels representing a logic "1" or a logic "0" as a function of an input signal for extended periods of time.

These and other objects of this invention will become more apparent when taken in connection with the following description of drawings, a brief description of which follows:

DESCRIPTION OF PREFERRED EMBODIMENTS

Figure 1:
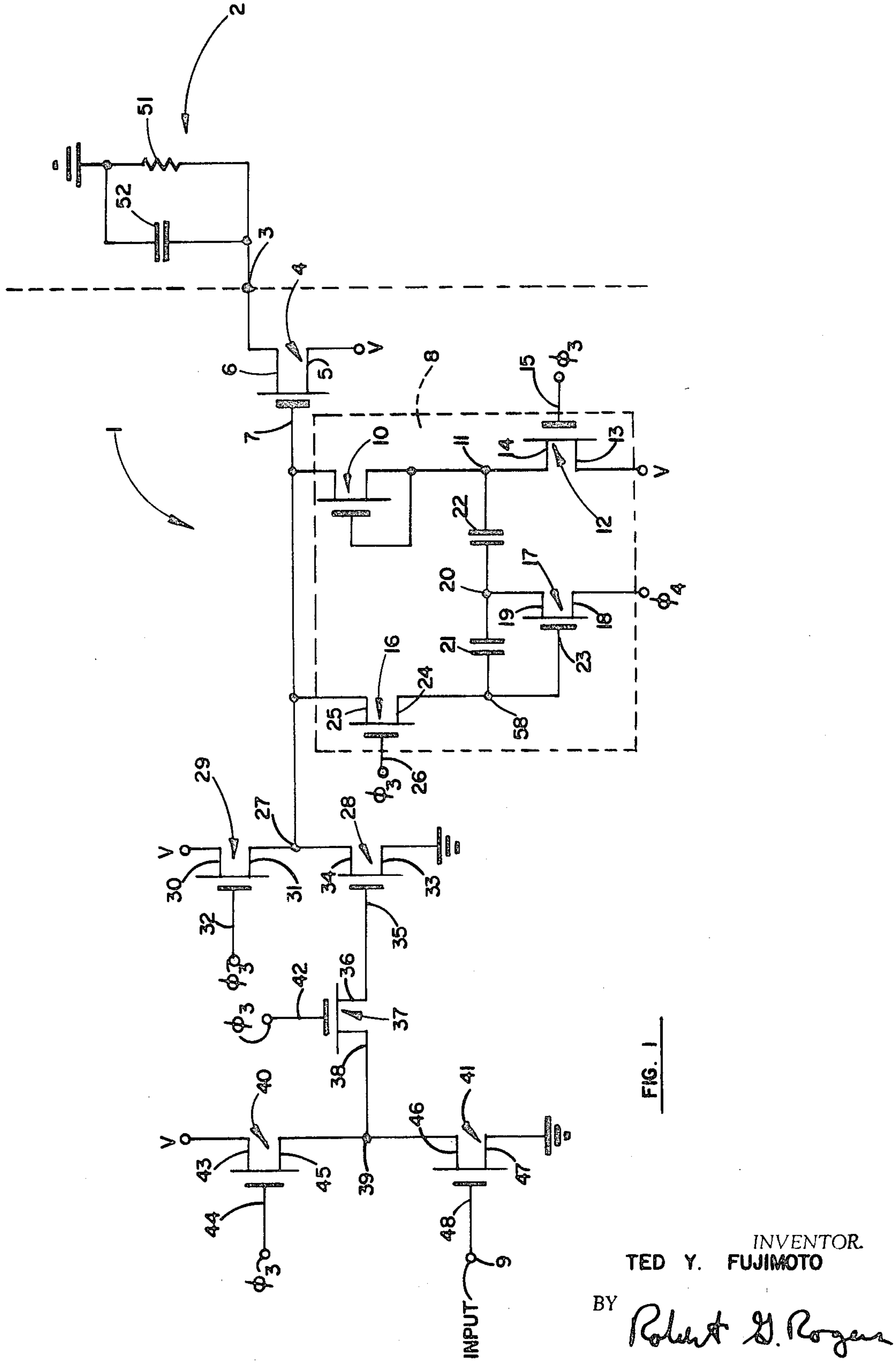
FIG. 1 is a schematic diagram of one embodiment of the four phase field effect transistor DC driver.

FIG. 1 is a schematic diagram of a four phase field effect transistor DC driver circuit 1 for providing a constant DC voltage output across load 2. The DC output voltage is provided at output terminal 3 by field effect transistor 4 having its drain electrode 5 connected to DC voltage supply v. and its source electrode 6 connected to output terminal 3.

The gate electrode 7 is connected to circuit 8 which provides a boosted voltage level on the gate electrode 7 during certain phase times of the four phase clocking cycle as a function of the state of the input signal appearing on terminal 9. The circuit comprises field effect transistor 10 having its gate electrode and drain electrode connected to common point 11 and its source electrode connected to the gate electrode 7 of field effect transistor 4. Field effect transistor 12 is connected in series between supply voltage v. and common point 11. Drain electrode 13 of field effect transistor 12 is connected to the supply voltage and source electrode 14 is connected to common point 11. Gate electrode 15 of field effect transistor 12 is connected to the clock signal $\phi_3$.

Circuit 8 also includes a series circuit comprising field effect transistor 16 and field effect transistor 17. Field effect transistor 17 has its drain electrode 18 connected to clock signal $\phi_4$ and its source electrode 19 connected to common point 20 between capacitors 21 and 22. Capacitor 22 is connected between common point 11 and common point 20. Capacitor 21 is connected between common point 20 and the gate electrode 23 of transistor 17. Gate electrode 23 is electrically connected to drain electrode 24 of field effect transistor 16. Source electrode 25 of field effect transistor 16 is connected to gate electrode 7 of field effect transistor 4. Gate electrode 26 of field effect transistor 16 is connected to clock signal $\phi_3$.

The components of circuit 8 comprising field effect transistor 16, field effect transistor 17, capacitors 21 and 22 in combination with field effect transistor 12 provide the boosted voltage level on gate electrode 7 for overdriving, or enhancing the conduction of, field effect transistor 4 when providing a constant DC output voltage approximately equal to the supply voltage v. Field effect transistor 10 connected as a diode, or rectifier, isolate the voltage on gate electrode 7 after $\phi_4$ so that the output on terminal 3 for DC load 2 remains substantially constant.

Although not shown, it should be understood that an inherent capacitance exists at the gate electrode 7 for storing the boosted voltage level until either discharged or until it drains away due to the parasitic leakage normally inherent in field effect transistor circuits such as the one shown. A discrete capacitor may be added if required.

Field effect transistor 17 and capacitor 21 control the gating of the clock signal $\phi_4$ onto the capacitor 22 so that the clock signal $\phi_4$ is switched on or off by the input signal gated from terminal 9 to point 27. As a result, no DC power is consumed by the circuit. It is pointed out that it is possible to connect the $\phi_4$ clock signal directly to point 20. However, such a direct connection creates several problems. For example, when the gate electrode 7 is at logic 0, at the end of $\phi_4$, capacitor 22 produces positive charge into the substrate via the drain or source regions of FET's 10 and 12 since the drain or source regions comprise PN-junctions with the substrate. As a result, the circuit must be provided with means for preventing the discharging of charge through those PN-regions. FIG. 1 prevents such a discharge by field effect transistor 17 which disconnects the clock signal $\phi_4$ from point 20. In other circuits, a "guard ring" may be required. If a guard ring is required, additional semiconductor chip area is required and additional power is dissipated.

Gate electrode 7 is also connected to common point 27 between field effect transistors 28 and 29. Field effect transistor 29 has its drain electrode 30 connected to supply voltage v. and its source electrode 31 connected to common point 27. The gate electrode 32 of field effect transistor 29 is connected to clock signal $\phi_3$.

Field effect transistor 28 has its source electrode 33 connected to electrical ground and its drain electrode 34 connected to the gate electrode 7 and common point 27. The gate electrode 35 of transistor 28 is connected to source electrode 36 of field effect transistor 37. The drain electrode 38 of field effect transistor 37 is connected to common point 39 between field effect transistors 40 and 41. Gate electrode 42 of field effect transistor 37 is connected to clock signal $\phi_3$.

Gate electrode 44 of field effect transistor 40 is also connected to clock signal $\phi_3$. The drain electrode 43 is connected to voltage supply v. and the drain electrode 45 is connected to common point 39. The drain electrode 46 of field effect transistor 41 is connected to common point 39 and the source electrode 47 is connected to electrical ground. The gate electrode 48 is connected to input terminal 9 before the driver circuit 1.

Field effect transistors 40, 41 in combination with field effect transistors 28 and 29, separated by transistor 37, responds to the input signal during $\phi_3$. The input signal is twice inverted to point 27.

It should be understood for the embodiment shown that a logic "1" state is represented by the approximate value of the supply voltage. High-threshold field effect transistors may have a 6 volt threshold loss. The logic "0" voltage level is represented by electrical ground. Other logic conventions are also within the scope of the invention. The exact convention is determined to a certain extent by the type of field effect transistor being used.

Figure 3:
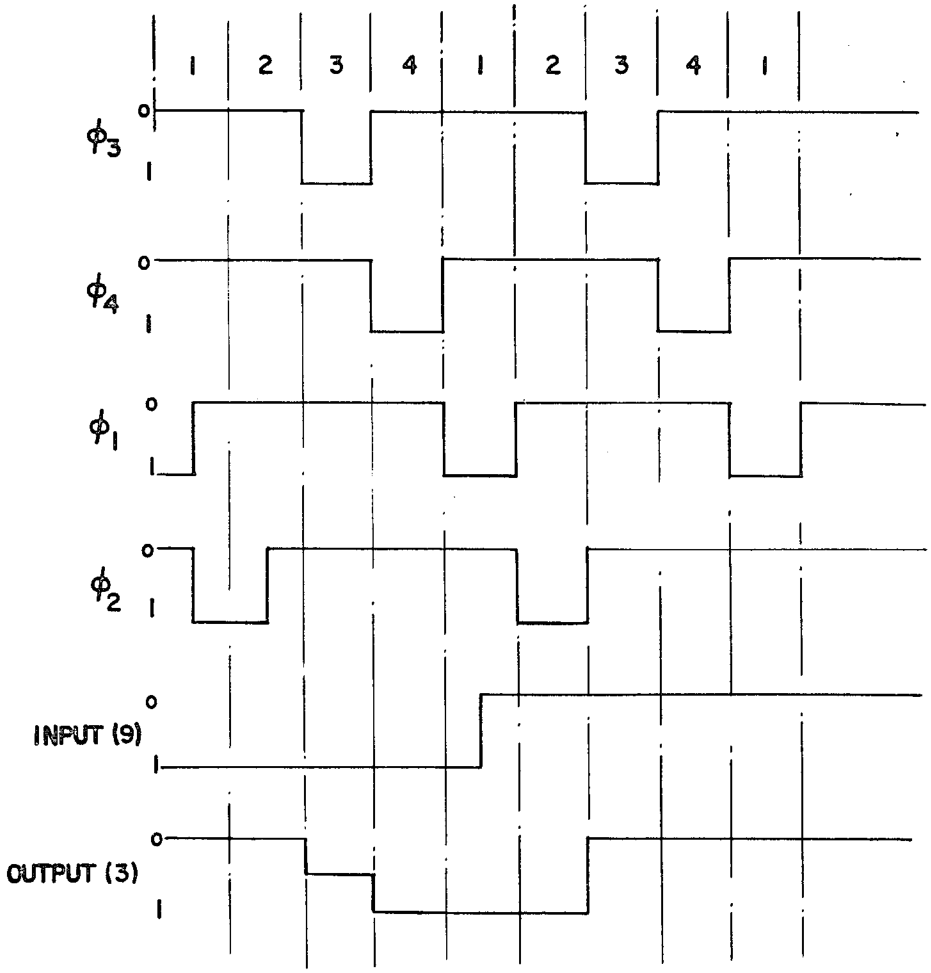
FIG. 3 is a diagram of the clock signals comprising a four phase clocking cycle and a diagram of the input and output signals for selected input conditions.

The relationship of the clock signals is shown in FIG. 3. Although FIG. 1 shows two phase recurring clock signals ($\phi_3$, $\phi_4$) representing two phases, it should be understood that in order to provide a constant output voltage, a certain interval of time must elapse before the output can be changed. That interval is represented by phases one and two ($\phi_1$, $\phi_2$) of the four phase clock signal used to describe the preferred embodiment of the invention.

For purposes of describing the operation of the FIG. 1 circuit, FIG. 3 and FIG. 1 are used. The circuit operates in a noninverting mode so that a signal representing a logic "1" at the input is not inverted at the output. When the input is logic "1," the output is also logic "1."

During $\phi_3$ time, i.e., when the $\phi_3$ clock signal is true, the input on terminal 9 is evaluated. That is, if the input is true, common point 39 is connected to electrical ground since field effect transistor 41 is made large relative to field effect transistor 40. If the common point 39 is connected to electrical ground, the gate electrode 35 of field effect transistor 28 is also connected to electrical ground since field effect transistor 37 is turned on during $\phi_3$ time.

If the gate electrode 35 is connected to electrical ground, field effect transistor 28 remains off and common point 27 is driven to approximately the supply voltage, v., minus a threshold voltage drop across field effect transistor 29. Field effect transistor 29 is turned on by $\phi_3$. Simultaneously, field effect transistor 4 is turned on and the output is driven approximately to the supply voltage minus two threshold voltage drops i.e., the threshold voltage drop across field effect transistor 29 and the threshold voltage drop across field effect transistor 4.

In addition, during $\phi_3$ time, field effect transistor 16 is turned on for turning field effect transistor 17 on. Since the $\phi_4$ clock signal is false during $\phi_3$ time, common point 20 is connected to electrical ground so that capacitor 21 is charged to approximately the supply voltage minus one threshold voltage drops. Similarly, field effect transistor 12 is turned on so that common point 11 is connected to the supply voltage v. reduced by one threshold drop across field effect transistor 12. As a result, capacitor 22 is charged to the approximate value of supply voltage minus one threshold drop. Field effect transistor 10 is turned off since the gate electrode voltage does not exceed the source electrode voltage by at least one threshold.

At the end of $\phi_3$, the $\phi_4$ clock signal becomes true. Field effect transistor 17 is turned on by the voltage stored on capacitor 21. As a result, common point 20 is connected to the $\phi_4$ voltage which is approximately equal to the supply voltage minus one threshold drop across field effect transistor 17. The increase of voltage at common point 20, previously at electrical ground, causes an immediate boost on the gate electrode 23 of field effect transistor 17 and an immediate boost across capacitor 22 at common point 11.

The boost on gate electrode 23 substantially enhances the conduction of field effect transistor 17 to further increase the voltage at common point 20 to the voltage level of clock signal $\phi_4$. Common point 11 is also boosted an equivalent amount.

As a result of boosting the voltage at common point 11, field effect transistor 10 is turned on for boosting at the gate electrode 7 of field effect transistor driver 4. The boosted gate electrode 7 substantially enhances the conduction of field effect transistor 4.

The enhancement of field effect transistor 4 substantially reduces the voltage drop across that field effect transistor for increasing the DC voltage across load 2. As a practical matter, the supply voltage v. is divided between the impedances of field effect transistor 4 and DC load 2. However, by substantially enhancing the conduction of field effect transistor 4, a relatively small amount of the voltage is dropped across the transistor. For example, assuming the clock and supply voltages to be approximately equal to 25 volts, the gate electrode voltage at field effect transistor 4 could be boosted to approximately 35 volts. For those voltage values, the DC output voltage at output terminal 3 would be approximately 20 volts.

By way of a further example, if the load resistor 51 is equal to 20 V., and the load capacitor 52 is equal to 200 pf., the circuit would be capable of providing a DC voltage of approximately 20 volts for the voltage values assumed and one ma of load current for a relatively long period of time.

The capacitor 21 should be large relative to the capacitance of the gate electrode 23 so that the $\phi_4$ clock voltage is fedback to the gate electrode 23 of field effect transistor 17 instantaneously at the beginning of $\phi_4$ time. The instantaneous feedback voltage is necessary to enhance the conduction of field effect transistor for providing the boosting effect at common point 11.

At the end of $\phi_4$, the common point 20 is again connected to ground through field effect transistor 17 and the boosted voltage across capacitor 22 is removed. As a result, field effect transistor 10 is turned off for isolating the voltage on gate electrode 7. The $\phi_1$ phase follows the $\phi_4$ phase as shown in FIG. 3.

In addition, during $\phi_1$, the field effect transistor 16 is turned off for further isolating gate electrode 11. Field effect transistor 28 and field effect transistor 29 are also turned off during $\phi_1$ time.

In the usual case, the load requirements are predetermined such that load current is required for the minimum period covered by $\phi_1$ and $\phi_2$. If additional time requirements are imposed on the DC output, it might be necessary to decrease the interval between the phases of the clock cycle. Alternately, additional phases could be added as necessary to enable the DC output voltage a terminal 3 to be maintained for a predetermined period of time.

Assuming that the input changes from a logic "1" to a logic "0" during the $\phi_2$ time of the following clock cycle, field effect transistor 41 would remain off during $\phi_3$ and common point 39 would be driven to approximately the reference voltage level v. Field effect transistor 28 would be turned on for driving common point 27 approximately to ground. Field effect transistors 29 and 28 would be ratioed such that substantially all of the supply voltage v. would be dropped across field effect transistor 29 for the input condition assumed.

Since common point 27 would be connected to electrical ground, the gate electrode 7 of field effect transistor 4 would also be connected to electrical ground and field effect transistor 4 would remain off. The output at terminal 3 would then change at the beginning of $\phi_3$ time from a DC voltage level representing logic "1." The exact change and time required would depend on the load conditions.

If no change occurs at the input during the following $\phi_3$ time, the voltage at gate electrode 7 remains at the value stored from the previous clock cycle. The circuit 8 again provides a boosted voltage level for gate electrode 7 during $\phi_4$ time for replacing the charge which may have leaked from gate electrode 7 during the $\phi_1$ and $\phi_2$ clock intervals. The amount by which the gate electrode voltage changes from one clock cycle to the next is a function of a particular circuit. The leakage due to PN-junctions, oxide dielectrics and surfaces etc., may change as a function of circuit layout, types of material being used, and other factors well known to persons skilled in the art.

Figure 2:
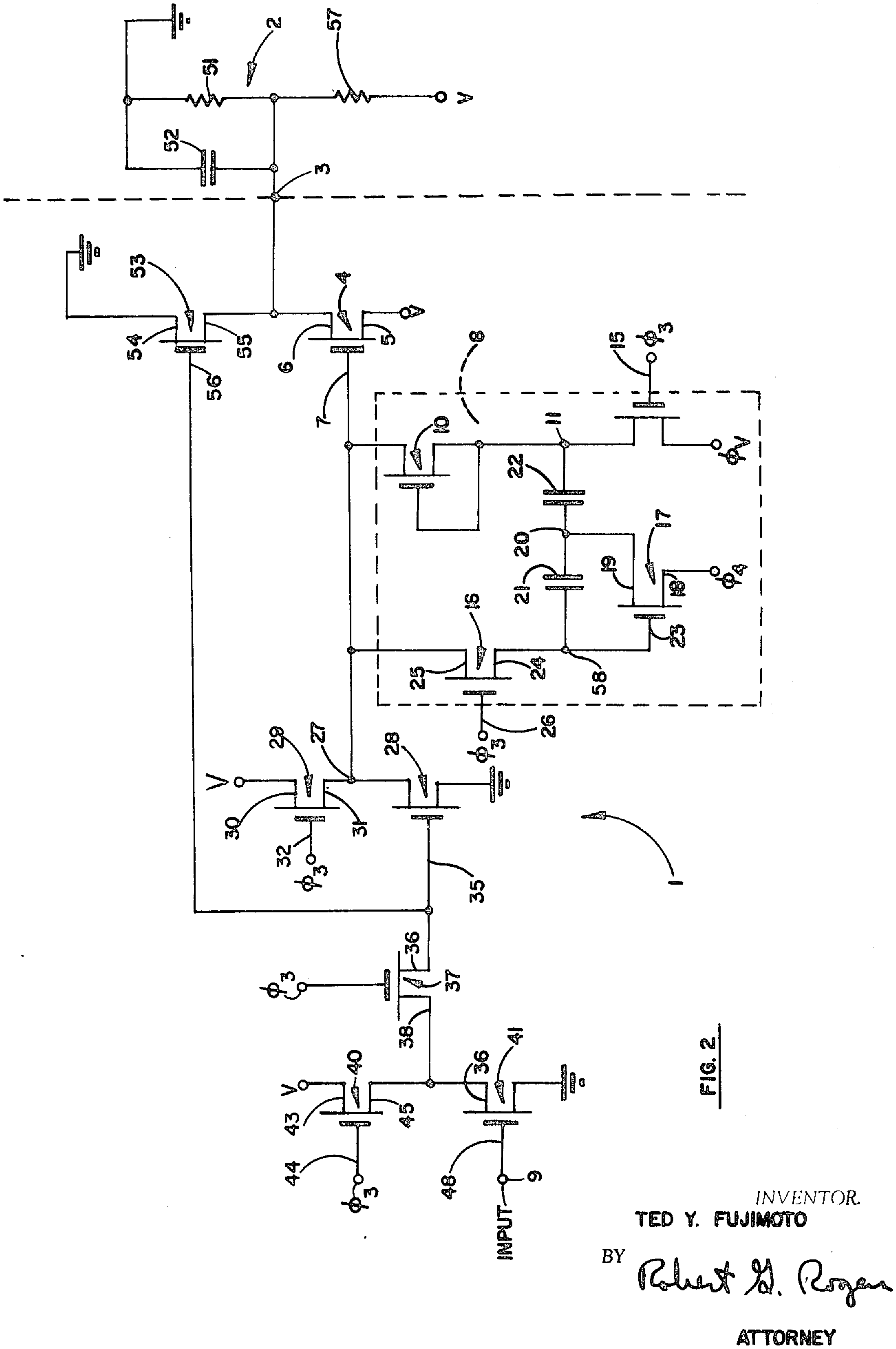
FIG. 2 is a schematic diagram of a second embodiment of the four phase filed effect transistor using a push-pull output.

FIG. 2 is a different embodiment of the FIG. 1 circuit. Field effect transistor 53 has been added between the output terminal 3 and electrical ground. The source electrode 54 of field effect transistor 53 is connected to electrical ground to provide a logic "0" reference voltage level when the input is logic "0." The drain electrode 55 is connected to the output 3 and to source electrode 6 of field effect transistor 4. Resistor 57 is connected between the supply voltage v. and the output 3 to represent a DC load that transistor 53 may drive.

The operation of the FIG. 2 circuit for providing a DC voltage level representing a logic 1 i.e., approximately v., is substantially the same as the operation described in connection with FIG. 1. For that reason, the operation of the circuit for providing a logic 1 DC voltage is not repeated. Instead the operation of the circuit for providing a logic "0" at output 3 is briefly described.

During $\phi_3$, if the input is a logic "1," the gate electrode 35 of field effect transistor 28 is connected to electrical ground. As a result, the gate electrode 56 of field effect transistor 53 is also connected to electrical ground for holding field effect transistor 53 off. As indicated previously, when the input is at a logic "1" voltage, the output is also driven to a logic "1" DC output voltage level.

However, if the input is at a logic "0" voltage level as shown in FIG. 3 for $\phi_2$ of the second illustrated clock cycle, during the $\phi_3$ clock interval, field effect transistor 41 is held off such that gate electrode 35 and gate electrode 56 of field effect transistors 28 and 53 respectively are set to a voltage level approximately equal to the supply voltage v. Field effect transistor 53 is therefore turned on for driving the output terminal 3 to the electrical ground voltage level appearing on source electrode 54. Current is supplied through resistor 57.

The electrical ground voltage level representing a logic "0" state, is held for at least the following two clock intervals comprising $\phi_1$ and $\phi_2$. If the input does not change when evaluated during the following $\phi_3$ time, the output remains at the 0 state.

As indicated by FIG. 3 and in connection with the description of the FIG. 1 and FIG. 2 embodiments, the four phase clock signals comprising $\phi_1$, $\phi_2$, $\phi_3$ and $\phi_4$, are phase recurring clock signals. In other words, $\phi_1$ occurs at intervals separated by phases 2, 3, and 4. Similarly, $\phi_2$ recurs at intervals separated by phases 3, 4, and 1. The other relationships are obvious.

What is claimed is:

1. A multiphase field effect transistor driver for a DC load comprising, a field effect transistor driver connected between said DC load and a first voltage level for providing a DC voltage to said DC load, said field effect transistor driver having a gate electrode, means responsive to an input signal for boosting a voltage level on said gate electrode during a first phase recurring clock signal comprising part of a multiphase clock signal cycle, and for isolating the boosted voltage on the gate electrode at least during the phase recurring clock signal immediately preceding said first phase recurring clock signal of the succeeding clock cycle, said means connected further including means for changing the voltage level on said gate electrode during said preceding phase recurring clock signal if said input signal changes after said first phase recurring clock signal, a second field effect transistor connected between said DC load and a second voltage level, said second field effect transistor having a gate electrode connected to said means responsive, said first voltage level representing one logic state and said second voltage level representing a different logic state, said second recited gate electrode being set to a voltage by said means responsive as a function of an input signal, said voltage being different from the voltage on said first recited gate electrode whereby said first and second field effect transistors are not conductive at the same time.

2. The driver recited in claim 1 wherein said means responsive includes means for inverting the input signal twice and includes means for providing the once inverted input signal to the gate electrode of said second field effect transistor.

3. A multiphase field effect transistor driver for applying DC voltage levels to a DC load in response to logic states of an input signal, said field effect transistor driver comprising, a field effect transistor driver connected between said DC load and a first voltage level providing a DC voltage level to said DC load, said field effect transistor driver having a gate electrode, boosting field effect transistor circuit means including first and second capacitor means, said boosting field effect transistor circuit means being responsive to a logic state of an input signal during a first interval of a multiple phase recurring clock cycle for charging said first and second capacitor means to a voltage level, including means for applying said voltage level to the gate electrode of said field effect transistor driver, said boosting field effect transistor circuit means being responsive to a clock signal during a second interval of said multiple phase clock cycle for boosting the voltage level across said first and second capacitor means if said first and second capacitor means were previously charged to a voltage level in response to a first logic state of an input, isolation field effect transistor means connected between said second capacitor means and the gate electrode of said field effect transistor driver, said isolation field effect transistor means being responsive to the boosted voltage level across said second capacitor means for applying said boosted voltage level to said gate electrode.

4. The driver recited in claim 3 wherein said isolation field effect transistor means has its gate electrode and one electrode connected to said second capacitor means and its other electrode connected to said gate electrode of said field effect transistor driver, said boosting field effect transistor circuit means including means for removing said boosted voltage level across said first and second capacitor means at the end of said interval, the difference between the gate electrode voltage of said field effect transistor driver and the voltage across said second capacitor means at the end of said second interval turning said isolation field effect transistor means off for isolating said gate electrode from said field effect transistor boosting circuit means.

5. The driver recited in claim 4 wherein said boosting field effect transistor circuit means includes first, second and third field effect transistors, means responsive to the input for providing a signal representing the logic state of the input signal to the gate electrode of said field effect transistor driver, said first field effect transistor being connected in electrical series between said means responsive and the gate electrode of said second field effect transistor, said first capacitor means being connected between the gate electrode of said second field effect transistor and one of its other electrodes, the other electrode of said second field effect transistor being connected to a clock signal corresponding to said second interval, said second capacitor means being connected between said one electrode of said second field effect transistor and the common connection of the gate electrode and said one electrode of said isolation field effect transistor, said gate electrode of said first field effect transistor being connected to a clock signal corresponding to said first interval for isolating said second field effect transistor and said first capacitor means from said means responsive and from said gate electrode of said field effect transistor driver following said second interval, said third field effect transistor connected to the common point between said gate electrode of said isolation field effect transistor and said second capacitor means for charging said second capacitor means during said second interval.

6. A multiphase field effect transistor driver comprising, a first field effect transistor having a drain electrode connected to a terminal for a voltage, a source electrode connected to an output terminal, and a gate electrode, means responsive to an input signal connected to said gate electrode, second and third field effect transistors connected in electrical series between said first recited gate electrode and a terminal for a voltage, said second field effect transistor having its gate electrode and one other electrode connected to a common point and to one electrode of said third field effect transistor, the other electrode of said second field effect transistor being connected to the gate electrode of said first field effect transistor, a fourth field effect transistor having one electrode connected to the gate electrode of said first field effect transistor, and having one other electrode and a gate electrode, a fifth field effect transistor having its gate electrode connected to said other electrode of said fourth field effect transistor and having two additional electrodes, a first capacitor connected between one of said two additional electrodes of said fifth field effect transistor and its gate electrode, a second capacitor connected between said one electrode of said fifth field effect transistor and the common point between said second and third field effect transistors.

* * * * *